United States Patent
Woodhams

(10) Patent No.: US 9,758,348 B2
(45) Date of Patent: Sep. 12, 2017

(54) STAIRLIFTS

(71) Applicant: Stannah Stairlifts Limited, Hampshire (GB)

(72) Inventor: Max Daniel Woodhams, Hampshire (GB)

(73) Assignee: Stannah Stairlifts Limited, Hampshire (GB)

( * ) Notice: Subject to any disclaimer, the term of this patent is extended or adjusted under 35 U.S.C. 154(b) by 518 days.

(21) Appl. No.: 14/362,438

(22) PCT Filed: Nov. 26, 2012

(86) PCT No.: PCT/GB2012/052916
§ 371 (c)(1),
(2) Date: Jun. 3, 2014

(87) PCT Pub. No.: WO2013/079922
PCT Pub. Date: Jun. 6, 2013

(65) Prior Publication Data
US 2014/0332320 A1    Nov. 13, 2014

(30) Foreign Application Priority Data
Dec. 3, 2011 (GB) .................................. 1120834.5

(51) Int. Cl.
*B66B 9/08* (2006.01)
(52) U.S. Cl.
CPC .............. *B66B 9/08* (2013.01); *B66B 9/0853* (2013.01); *B66B 2009/0892* (2013.01)

(58) Field of Classification Search
CPC .......................... B66B 2009/0892; B66B 9/08
See application file for complete search history.

(56) References Cited

U.S. PATENT DOCUMENTS

| | | | |
|---|---|---|---|
| 3,341,251 A * | 9/1967 | Costin ...................... | A47C 5/12 297/452.59 |
| 4,306,750 A | 12/1981 | Wenger et al. | |
| 5,630,648 A | 5/1997 | Allard et al. | |
| 2002/0074189 A1 | 6/2002 | Hester et al. | |
| 2005/0214104 A1* | 9/2005 | Strong .................. | A01M 31/02 414/546 |
| 2007/0051562 A1* | 3/2007 | Titchener .............. | B66B 9/0853 187/200 |

(Continued)

FOREIGN PATENT DOCUMENTS

| | | | |
|---|---|---|---|
| DE | 1115421 B | 10/1961 | |
| EP | 1197465 A1 | 4/2002 | |

(Continued)

OTHER PUBLICATIONS

International Search Report and Written Opinion for PCT/GB2012/052916, filed Nov. 26, 2012.

(Continued)

*Primary Examiner* — William E Dondero
*Assistant Examiner* — Diem Tran
(74) *Attorney, Agent, or Firm* — Dinsmore & Shohl LLP

(57) ABSTRACT

A stairlift and/or a method of supporting a user on a stairlift in which the seat is configured to positively retain the user and in which the seat-to-footrest height is set so as to reduce flexure of the knee joints as well as to reduce the intrusion of the passenger into the stairway.

17 Claims, 3 Drawing Sheets

(56) References Cited

U.S. PATENT DOCUMENTS

2009/0308694 A1* 12/2009 Szentistvany ........ B66B 9/0838
187/201

FOREIGN PATENT DOCUMENTS

| GB | 2484709 A | 4/2012 |
| WO | WO-85/01643 A1 | 4/1985 |
| WO | WO-96/10937 A1 | 4/1996 |
| WO | WO-01/00061 A1 | 1/2001 |

OTHER PUBLICATIONS

UK Search Report of application Serial No. GB1120834.5, issued Mar. 1, 2013.

* cited by examiner

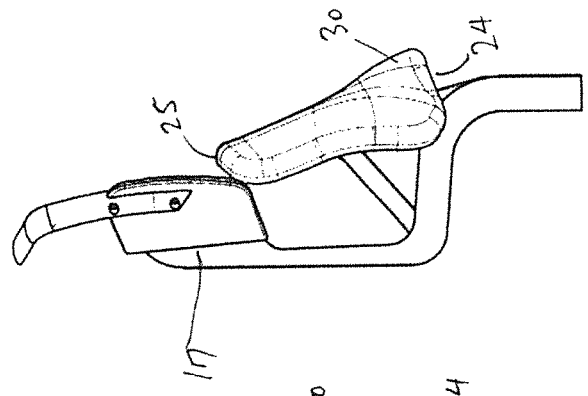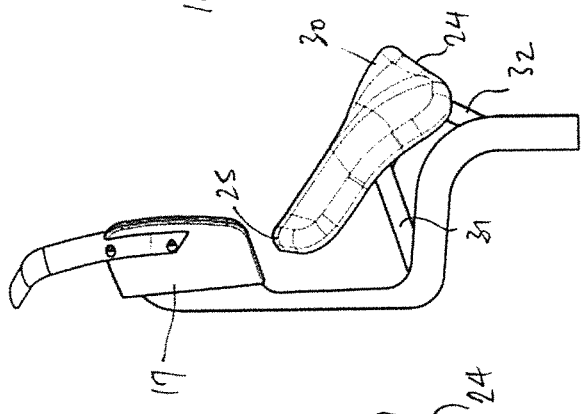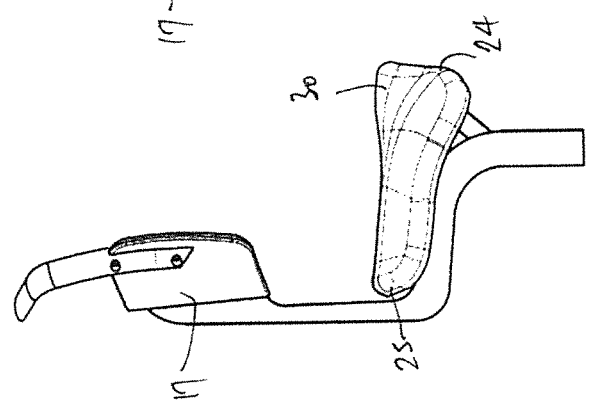

STAIRLIFTS

CROSS REFERENCE TO RELATED APPLICATIONS

This application is the U.S. National Phase of PCT application Serial No. PCT/GB2012/052916, filed Nov. 26, 2012, which claims priority to GB 1120834.5, filed Dec. 3, 2011, the contents of which are incorporated herein in their entirety.

FIELD OF THE INVENTION

This invention relates to a stairlifts and, in particular though not necessarily solely, to a stairlift suitable for use on narrow stairways and/or for use by persons whose leg flexure is compromised.

BACKGROUND TO THE INVENTION

The design of stairlifts necessarily involves a number of compromises. One compromise arises from the need to minimize the intrusion of the stairlift into the stairway. This rises in significance when the stairway is narrow and there is a risk that a user, particularly the user's knees or feet, will come into contact with the stairway during movement of the stairlift up and down the stairway.

A further compromise arises from the need to accommodate users whose knee and/or ankle flexure is impaired. In some cases, assuming a fully seated position may cause a user pain or other discomfort.

Conventionally, a stairlift proceeds up and down a rail mounted on a stairway with the user seated facing in a direction perpendicular to the direction of motion, and the user's knee joints substantially defining right angles. Not only does this configuration maximize the intrusion of the user into the stairway but it also requires considerable knee flexure which can be painful.

Published International Patent Application No. WO2005/087644 seeks to address the intrusion problem by providing a mechanism that pivots the stairlift chair about a vertical axis during movement of the stairlift along the rail, the pivot angle being dependent on the position of the stairlift along the rail. European Patent Application No. 2 119 660 describes an arrangement in which the chair can not only be pivoted to face in a downward direction, but can also be lowered and slanted backwards to provide increased clearance between a passenger and a ceiling overlying the stairway.

Whilst the two patent applications mentioned above address the issue of narrow stairways, each presents a problem in that it is generally considered undesirable for a stairlift to be facing in a downwards or downhill direction whilst in motion. This is because, in the event of a malfunction in the stairlift, the stairlift could come to a halt at some point in its journey. In this event a passenger would be exposed to additional danger if he/she attempted to dismount from the stairlift, because the distance from the chair to the adjacent (downhill) part of the stairway is that much greater than when the stairlift is in the more conventional configuration. A further problem with both proposals is that they do nothing to limit the flexure of a user's knees.

The issue of knee flexure is addressed by stairlifts in which the user stands, supporting his/her own weight, during the journey. This leads to safety concerns, it being generally accepted that users should be positively supported during a stairlift journey. A variation of the standing stairlift, and one which offers a degree of support, is the perch stairlift where the user's bottom is partly supported. This form of stairlift requires the user to push back on the perch and, in the event the user looses his/her footing, gravity will cause the user to be displaced from the perch and, potentially, ejected from the stairlift.

It is an object of the present invention to provide a method of supporting a stairlift user, and/or a stairlift, that will go at least some way to addressing the aforementioned drawbacks; or which will at least provide a novel and useful choice.

SUMMARY OF THE INVENTION

Accordingly, in one aspect, the invention provides a method of supporting a user having a bottom, feet and knee joints on a stairlift having a seat to vertically support said user, said seat including a front edge and a rear edge; and a footrest, said method being characterised in that it comprises configuring said seat to resist movement of said user in a direction from said rear edge towards said front edge, and establishing a vertical distance between said footrest and said seat so that when said user is seated on said seat with said feet in contact with said footrest, an included angle defined by said knees is greater than 90°.

Preferably said method includes configuring said seat so that, with a user seated, at least part of said front edge is higher than said rear edge.

Preferably said method includes configuring said seat so that at least part of said front edge is capable of accommodation between the legs of said user.

Preferably said method includes dispacing said seat, in the absence of a user, to lower said front edge relative to said rear edge.

Preferably said method further includes biasing the movement of said seat to lower said front edge relative to said rear edge.

Preferably the vertical spacing between said seat and said footrest is set so that said included angle lies in the range of 95°-165°.

Preferably said method includes configuring said seat with one or more indentations between said front edge and said rear edge and positioned to receive the ischial tuberosities of a user.

Preferably said method includes forming said seat of materials of at least two different densities.

Preferably said method comprises providing a strip of material across said seat between said one or more indentations and said front edge, or in part defining those parts of said one or more indentations closest to said front edge, said strip of material being of a density greater than the density of the material in which said one or more indentations are formed.

In a second aspect, the invention provides a stairlift for supporting a user having a bottom, feet and knees, said stairlift having a seat to vertically support said user, said seat including a front edge and a rear edge; and a footrest and being characterised in that said seat is configured to resist movement of said user in a direction from said rear edge towards said front edge, and a vertical distance between said footrest and said seat is established to ensure that, when said user is seated on said seat with said feet in contact with said footrest, an included angle defined by said knees is greater than 90°.

Preferably, with a user in position, at least part of said front edge is higher than said rear edge.

Preferably said seat is configured so that said at least part of said front edge is capable of accommodation between the legs of said user. Preferably said forward edge is provided with a pommel.

Preferably said seat is displaceably mounted to enable said front edge to be lowered relative to said rear edge.

Preferably a biasing facility is provided to, in the absence of a user, displace said front edge into a lower position relative to said rear edge.

Preferably the vertical spacing between said seat and said footrest is set so that said included angle lies in the range of 95°-165°.

Preferably said seat includes one or more indentations between said front edge and said rear edge, said one or more indentations being positioned to receive the ischial tuberosities of a user.

Preferably said seat is formed of materials of at least two different densities.

Preferably said seat includes a strip of material extending laterally of said seat in a position between said one or more indentations and said front edge; or in part defining those parts of said one or more indentations closest to said front edge, said strip of material being of a density greater than the density of the material in which said one or more indentations are formed.

Preferably said seat is included in a chair having a backrest and at least one armrest.

Many variations in the way the present invention can be performed will present themselves to those skilled in the art. The description which follows is intended as an illustration only of one means of performing the invention and the lack of description of variants or equivalents should not be regarded as limiting. Wherever possible, a description of a specific element should be deemed to include any and all equivalents thereof whether in existence now or in the future.

BRIEF DESCRIPTION OF THE DRAWINGS

The various aspects of the invention will now be described with reference to the accompanying drawings in which:

FIG. 3a: show side views of part of the stairlift shown in FIG. 1 in to 3c positions of different loading;

DETAILED DESCRIPTION OF WORKING EMBODIMENT

Figure 2:
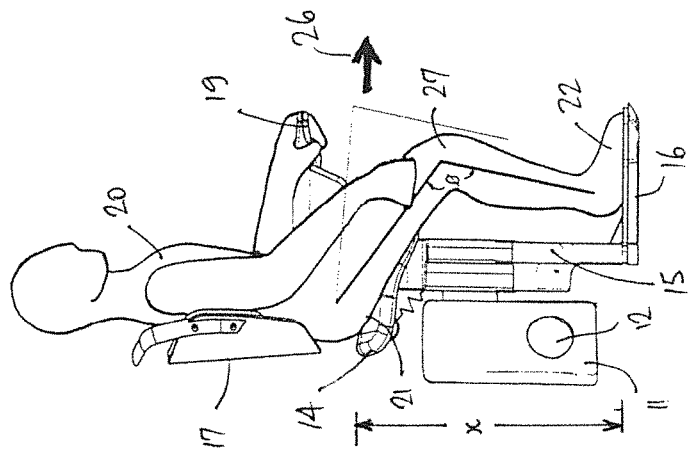
FIG. 2: shows a side elevation of the stairlift shown in FIG. 1 with a user seated thereon.
Figure 1:
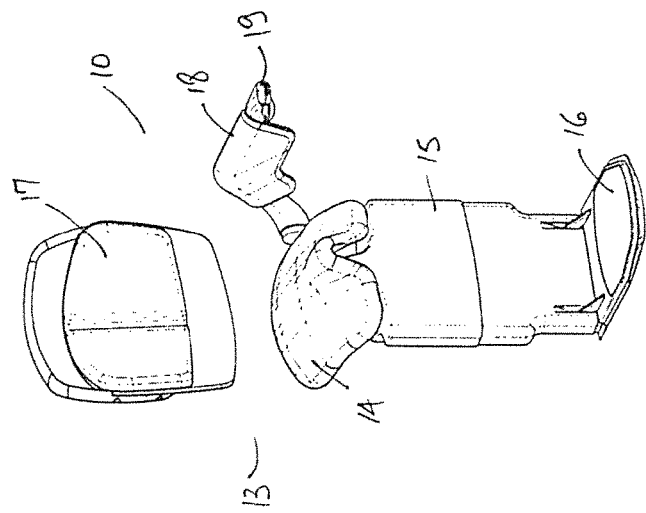
FIG. 1: shows an isometric schematic view of a stairlift according to the invention.

This invention provides a method of and means for supporting a user on a stairlift. The essential features of the invention are that a user is supported in a manner so that the knees have substantially less flexure yet the user's weight is still supported substantially through the bottom rather than through the legs. As a consequence, because the knees are subjected to less flexure, users having limited knee and/or ankle flexure are subjected to less discomfort and, because the knees are drawn back substantially when compared to existing stairlifts, the intrusion of the stairlift and user into the stairway is reduced. This, in turn, means that a stairlift according to the invention is particularly advantageous.

As can be seen in the drawings, a stairlift 10 is provided which includes a carriage 11 mounted for movement up and down a rail 12. Mounted on the carriage 11 are a chair 13 having a seat 14, an interface 15 and a footrest 16. In the conventional sense, the chair also includes a backrest 17 and at least one armrest 18. In the drawings only one armrest 18 is shown on which an operating control 19 is mounted.

The carriage 11 and rail 12 may be of any conventional form and do not comprise part of the invention. Accordingly no further description of these components need be provided.

FIG. 2 shows a user or passenger 20 seated on the seat 14 supported vertically on his/her bottom 21, and with his/her feet 22 resting on the footrest 16. As can be seen more clearly in FIGS. 3a to 3c, the seat 14 has a front edge 24 and a rear edge 25, and is configured to resist movement of the user in a direction from said rear edge towards said front edge i.e. in the direction of arrow 26 in FIG. 2. Further, the vertical distance x between the footrest 16 and the seat 14 is established to ensure that, when the user is, as shown in FIG. 2, seated on the seat with feet resting on the footrest, an included angle Ø defined by flexure of the knees 27 is greater than 90°.

In the particular example shown in the drawings at least part of the front edge 24 of the seat is formed into an upwardly extending protrusion or pommel 30. This pommel 30 is preferably configured to be accommodated between the legs of the user or, expressed in an alternative manner, the user straddles the pommel 30. Clearly, when the user is seated, the pommel 30 firmly locates the user and inhibits movement in the direction of arrow 26. The user's legs may then assume such flexure as may be required to enable the feet to contact the footrest 16 yet, as with conventional stairlift chairs, little or no vertical loading is placed on the legs.

The pommel 30 is preferably flared down into the seat 14 in both the longitudinal and lateral directions to enhance passenger comfort and to ensure that both the ischia and the under-thighs are adequately and comfortably supported yet with the thighs not being subjected to concentrated loads.

The interface 15 is preferably adjustable in length, or a selection of fixed length interfaces provided, so that distance x may be tailored to specific passengers. Distance x is preferably established so that angle Ø for a particular passenger lies in the range of 95°-165°.

Referring specifically to FIGS. 3a to 3c, and FIG. 4, the seat 14 is preferably pivotally mounted to assist a user mounting, and dismounting from, the stairlift; and to reduce the lateral intrusion of the stairlift when not in use. In the particular embodiment shown, the seat 14 is mounted by a four-bar pivoting arrangement provided by sets of two bars 31 and 32 on opposite sides of the seat, each bar being pivotally mounted at opposite ends to the underside of the seat 14 and to the chair base 33 respectively.

Three alternative positions for the seat 14 are shown in FIGS. 3a to 3c. In FIG. 3a the seat is shown in the position that is assumed when a user is seated on the seat. As a user leaves the seat, the seat assumes the position shown in FIG. 3b under the influence of a biasing facility, one form of which is described below. With no user in place on the seat, the seat may be further displaced into a stowage position as shown in FIG. 3c. When a user is again about to occupy the seat, the seat is first manually displaced to the position shown in FIG. 3b.

It will be appreciated that when the seat is in the position shown in FIG. 3b the rear edge 25 of the seat is positioned at a level above that of the front edge 24 and the pommel 30 is effectively lowered making it easier for a passenger to mount the seat. Positioning the seat as shown in FIG. 3b has the added benefit of ensuring that, when mounting the seat, the user's bottom engages an upper part of the seat 14 and the user is thus displaced back in the chair 13 as the seat rotates to the position shown in FIG. 3a. This, in turn, assists the objective of reducing the passenger intrusion into the stairway.

Figure 4:
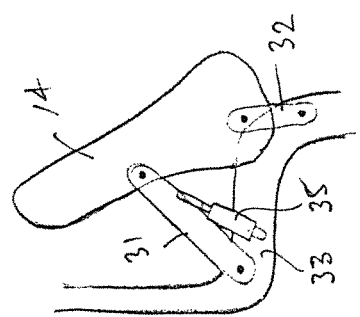
FIG. 4: shows a view corresponding to FIG. 3c of a biasing facility to displace a stairlift seat between the positions shown in FIGS. 3a, 3b & 3c.

The seat is preferably held in the positions shown in FIGS. 3b & 3c by a biasing facility which may, as shown schematically in FIG. 4, comprise a compression spring 35. The compression spring is preferably provided in the form of a small gas compression strut mounted between one of the arms 31 and the chair base 33.

Figure 5:
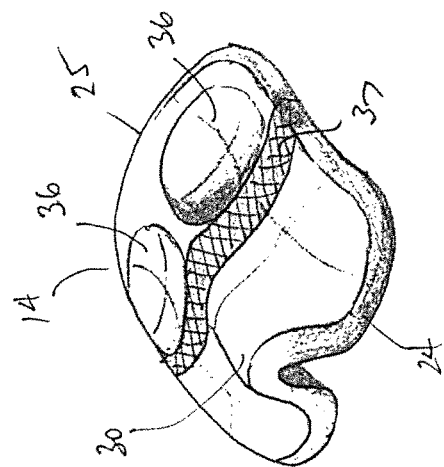
FIG. 5: shows a isometric view of a seat surface suitable for use in a stairlift according to the invention.

Turning now to FIG. 5, the seat 14 may be configured to provide an enhanced anatomical engagement with a user and/or formed or clad in materials of different densities with the objective of enhancing the user's feelings of security.

As can be seen, the seat surface is provided with one or more (in this case two) indentations 36 which are sized and positioned to receive the user's ischial tuberosities. These indentations 36 are likely to be located closer to the rear edge 25 of the chair so as to position the user as close as possible to the backrest 17, and obviously provide a further means of resisting movement of the user in the direction of arrow 26. As a further contribution to the user's feeling of security a strip 37, of material of greater density to the material defining the surrounding seat, may be provided across the seat in a position between the indentations 36 and the front edge 24 or, as shown, in part defining those edge parts of the indentations 36 closest to the front edge 24.

It will thus be appreciated that the invention, at least in the case of the embodiment described, not only positively supports and retains a user on the stairlift chair, but also enables the passenger's legs to be held in a configuration which subjects the knee and ankle joints to less flexure than conventional stairlift chairs. A further benefit is that the stairlift intrudes into the stairway to a significantly lesser extent that conventional stairlifts whilst not requiring the chair to be aligned with the direction of travel and thus, potentially, compromising user safety.

The invention claimed is:

1. A method of supporting a user on a stairlift, the method comprising:
   providing a stairlift having a seat and a footrest to vertically support the user, the seat having a front edge, an opposed rear edge, and a pair of side edges each extending between said front edge and said rear edge, said front edge having an upwardly extending and centrally located protrusion, said protrusion when in use projecting between the user's legs;
   mounting said seat such that said seat pivots between a mounting position and a tilted seated position, wherein in said tilted seated position said seat is at an angle to horizontal, wherein in said mounting position said protrusion is lower than in said tilted seated position, and as said seat is displaced from said mounting position to said tilted seated position, said protrusion displacing the user in a direction from said front edge toward said rear edge, said tilted seat position being a use position wherein said seat is movable along the stairlift; and
   establishing a vertical distance between said footrest and said seat so that when the user is seated on said seat in said tilted seated position with the user's feet in contact with said footrest, an included angle defined by the user's knees is greater than 90°.

2. A method in accordance with claim 1, further comprising:
   displacing said seat, in the absence of the user, to lower said front edge relative to said rear edge.

3. A method in accordance with claim 2, further comprising:
   biasing the movement of said seat to lower said front edge relative to said rear edge.

4. A method in accordance with claim 1, wherein the vertical distance between said seat and said footrest is set so that said included angle lies in the range of 95°-165°.

5. A method in accordance with claim 1, wherein said providing step further comprises providing said seat with one or more indentations between said front edge and said rear edge, said one or more indentations positioned to receive the user's ischial tuberosities.

6. A method in accordance with claim 5, further comprising:
   providing a strip of material across said seat, said strip of material being disposed in a position selected from a group consisting of:
      a position between said one or more indentations and said front edge; and
      a position defining a portion of said one or more indentations closest to said front edge;
   said strip of material being of a density greater than a density of a material in which said one or more indentations are formed.

7. A method in accordance with claim 1, wherein said seat has at least two different densities of materials.

8. A method in accordance with claim 1, wherein when said seat is in said tilted seated position and in said mounting position each side edge has a downward slope from said rear edge toward said front edge on both sides of said protrusion.

9. A stairlift for supporting a user, said stairlift comprising:
   a seat to vertically support the user, said seat having a front edge, an opposed rear edge, and a pair of side edges each extending between said front edge and said rear edge, said front edge having an upwardly extending and centrally located protrusion, said protrusion when in use projecting between the user's legs, said seat being mounted to pivot between a mounting position and a tilted seated position, wherein in said tilted seated position said seat is at an angle to horizontal, wherein in said mounting position said protrusion is lower than in said tilted seated position and, as said seat is displaced from said mounting position to said tilted seated position, the user is displaced by said protrusion in a direction from said front edge toward said rear edge, said tilted seat position being a use position wherein said seat is movable along the stairlift; and
   a footrest, a vertical distance being defined between said footrest and said seat, the vertical distance being chosen such that, when the user is seated on said seat in said tilted seated position with the user's feet in contact with said footrest, an included angle defined by the user's knees is greater than 90°.

10. A stairlift in accordance with claim 9, wherein said upwardly extending and centrally located protrusion on said front edge includes a pommel.

11. A stairlift in accordance with claim 9, further comprising a biasing facility to, in the absence of said user, displace said seat into said mounting position.

12. A stairlift in accordance with claim 9, wherein the vertical distance between said seat and said footrest is chosen such that the included angle lies in the range of 95°-165°.

13. A stairlift in accordance with claim 9, wherein said seat includes one or more indentations between said front edge and said rear edge, said one or more indentations being positioned to receive the user's ischial tuberosities.

14. A stairlift in accordance with claim 13, wherein said seat includes a strip of material extending across said seat, said strip of material being disposed in a position selected from a group consisting of:

a position between said one or more indentations and said front edge; and a position defining a portion of said one or more indentations closest to said front edge;

said strip of material being of a density greater than a density of a material in which said one or more indentations are formed.

15. A stairlift in accordance with claim 9, wherein said seat is formed from materials of at least two different densities.

16. A stairlift in accordance with claim 9, wherein said seat is included in a chair having a backrest and at least one armrest.

17. A stairlift in accordance with claim 9, wherein when said seat is in said tilted seated position and in said mounting position each said side edge having a downward slope from said rear edge toward said front edge on both sides of said protrusion.

* * * * *